(12) United States Patent
Smith et al.

(10) Patent No.: US 6,375,867 B1
(45) Date of Patent: Apr. 23, 2002

(54) PROCESS FOR MAKING A POSITIVE TEMPERATURE COEFFICIENT CONDUCTIVE POLYMER FROM A THERMOSETTING EPOXY RESIN AND CONDUCTIVE FILLERS

(75) Inventors: James D. B. Smith, Monroeville; Karl F. Schoch, Jr., Pittsburgh, both of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/543,469

(22) Filed: Apr. 5, 2000

Related U.S. Application Data

(62) Division of application No. 08/666,028, filed on Jun. 19, 1996, now abandoned, which is a continuation-in-part of application No. 08/408,229, filed on Mar. 20, 1995, now abandoned, which is a division of application No. 08/158,586, filed on Nov. 29, 1993, now abandoned.

(51) Int. Cl.[7] ............... C08L 63/00; C08L 63/02; C08K 3/04; C08K 3/08; C08K 3/10
(52) U.S. Cl. ............ 252/511; 252/512; 252/513; 338/22 R; 523/340; 523/429; 523/457; 523/458; 523/468
(58) Field of Search ................. 252/511, 512, 252/513; 338/22 R; 523/340, 429, 457, 458, 468

(56) References Cited

U.S. PATENT DOCUMENTS

| | | | |
|---|---|---|---|
| 4,085,250 A | 4/1978 | Smith | |
| 4,137,275 A | 1/1979 | Smith et al. | |
| 4,206,066 A | 6/1980 | Rinehart | |
| 4,545,926 A | 10/1985 | Fouts, Jr. et al. | |
| 4,647,894 A | 3/1987 | Ratel | |
| 4,685,025 A | 8/1987 | Carlomagno | |
| 4,695,404 A | 9/1987 | Kwong | |
| 4,724,417 A | 2/1988 | Au et al. | |
| 4,774,024 A | 9/1988 | Deep et al. | |
| 4,775,778 A | 10/1988 | van Konynenburg et al. | |
| 4,822,832 A | 4/1989 | Chu et al. | |
| 4,857,880 A | 8/1989 | Au et al. | |
| 4,884,163 A | 11/1989 | Deep et al. | |
| 4,910,389 A | 3/1990 | Sherman et al. | |
| 5,049,850 A | 9/1991 | Evans | |
| 5,195,013 A | 3/1993 | Jacobs et al. | |
| 5,250,228 A | 10/1993 | Baigrie et al. | |
| 5,552,459 A | 9/1996 | Baumann et al. | |

OTHER PUBLICATIONS

Carlson, "Thermistors for Overcurrent Protection," *Machine Design*, pp. 161–165, 1981.
Lee et al., *Handbook of Epoxy Resins*, McGraw–Hill Book Co., pp. 13/7–15 and 14–33, 1982.
Shaland, "Circuit Protectors: Miniature But Mighty," *Machine Design*, pp. 82–84, 88–90, 1991.
Saunders et al., "Conductive Polymers Spark New Ideas," *Machine Design*, pp. 161–165, 1992.
Fang et al. "Conductive Polymers Prolong Circuit Life," *Design News*, pp. 99–100 and 102, 1992.
Lee et al., *Handbook of Epoxy Resins*, McGraw–Hill Book Co., p. 12/3 (Reissue 1982).

*Primary Examiner*—D. R. Wilson
(74) *Attorney, Agent, or Firm*—Martin J. Moran

(57) ABSTRACT

A process for making an improved current limiting composition comprising mixing an epoxy thermosetting resin containing more than one 1,2 epoxy groups per molecule with an acid anhydride curing agent, an epoxy reactive diluent, first and second co-accelerators and conductive additive particles to form a liquid mixture. The liquid mixture is heated at a first temperature range below gelation temperature while drawing a vacuum to drive off volatiles and gases. Continued heating at a second temperature range promotes gelation and heating a third temperature range effects a final cure. A first co-accelerator becomes effective during the gelation temperature range and a second co-accelerator does not become effective until the final cure temperature range. Gelation takes about 2 to 4 hours at about 130° C. to 140° C. and final cure takes about 13 to 18 hours at about 140° C. to 160° C. The epoxy resin is preferably a diglycidyl ether of bisphenol A, the epoxy reactive diluent is preferably a diglycidyl ether of neopentyl glycol, the acid anhydride hardener is preferably 1-methyl tetrahydrophthalic anhydride and the conductive additive particles are selected from the group consisting of carbon black, nickel fiber, nickel flake, nickel beads and copper flake. An effective amount of said alumina trihydrate is employed in the mixture to prevent dielectric breakdown, arcing and carbon tracking under high voltage conditions in current limiting compositions. The first co-accelerator is 1-methyl imidazole and the second co-accelerator is chromium acetylacetonate.

8 Claims, 5 Drawing Sheets

PROCESS FOR MAKING A POSITIVE TEMPERATURE COEFFICIENT CONDUCTIVE POLYMER FROM A THERMOSETTING EPOXY RESIN AND CONDUCTIVE FILLERS

CROSS REFERENCE TO RELATED APPLICATIONS

This application is a divisional of U.S. application Ser. No. 08/666,028 filed Jun. 19, 1996, now abandoned which is continuation-in-part of U.S. application Ser. No. 08/408,229 filed Mar. 20, 1995, abandoned which is a divisional of U.S. application Ser. No. 08/158,586 filed Nov. 29, 1993, now abandoned.

BACKGROUND OF THE INVENTION

1. Field of the Invention

This invention relates to a process for preparation of a current limiting composition and is in particular a process for preparation of an improved positive temperature coefficient (PTC) thermosetting epoxy polymer composition which has a low resistivity and temperature rise when used as a circuit component carrying normal current. Due to the present process for preparation of the epoxy when the current increases due to short circuit or overload, the composition temperature increases and changes to a high resistance state which limits the current to a safe value until the current is interrupted. When the current is interrupted, the thermosetting material cools and reverts back to its original low resistance state. The improved product made by this process has a specific application as a resettable fuse or current limiter in motor controls and switch gear equipment.

2. Background Information

Particularly useful devices comprising PTC conductive polymers are circuit protection devices. Such devices have a relatively low resistance under normal operating conditions of the circuit, but are "tripped," or converted to a high resistance state when exposed to excessive current or temperature. When the high resistance is caused by excessive current, the current passing through the PTC element causes it to self-heat to an elevated temperature which switches it to the high resistance state. The increase in resistance is accompanied by an expansion of the PTC element.

Conductive polymer compositions exhibiting PTC behavior, and electrical devices comprising them are well known as set forth, for example, in U.S. Pat. Nos. 5,098,940, 5,174,924 and 5,195,013. In recent years, they have been widely used for protecting motors, solenoids, telephone lines and batteries. For instance, PTC devices have been utilized as current limiters connected in series with the separable contacts of a current interrupter such as a circuit breaker. The PTC device prevents the short circuit current from reaching a level at which the circuit breaker becomes incapable of interrupting this current due to the inability to extinguish the arc struck between the separated contacts. Various polyethylene PITC compositions and electrical devices incorporating them are shown for example in U.S. Pat. Nos. 5,049,850; 5,195,013; 4,724,417; 4,545,926; 4,685,025; 4,647,894; 4,857,880; 4,910,389; 4,774,024; and 4,775,778.

Articles have also been published in the field such as "*Thermistors For Overcurrent Protection,*" Machine Design, Dec. 10, 1981, pp. 161–165; "*Conductive Polymers,*" Machine Design, Oct. 22, 1992, p. 161; "*Circuit Protectors,*" Machine Design, Dec. 12, 1991, p. 82; and "*Conductive Polymers,*" Design News, Nov. 9, 1992, p. 99.

SUMMARY OF THE INVENTION

A process for making an improved PTC conductive polymeric composition has been provided which uses a thermosetting epoxy resin combined with conductive particles of carbon black and/or metal as a current limiting composition which has many technical advantages over the current state of the art. These advantages include: (a) improved stability of epoxy resin over polyethylene resin; (b) less degradation and "shedding" of carbon than seen with the polyethylene PTC devices; (c) a more compact polymer system in which conductive additives and epoxy chains are chemically locked and intertwined into a stable polymer matrix; (d) improved high voltage arc and track resistance and diminished partial discharge characteristics; and (e) lack of plasticizing effect caused by thermoplastic additives which causes creeping or a ratcheting effect when thermoplastic separates from the epoxy matrix with each thermal cycle.

The PTC current limiting composition comprises a chemically cross-linked epoxy thermoset resin polymer and conductive additive particles dispersed in the resin. The thermosetting epoxy resin comprises more than one 1,2 epoxy groups per molecule and an acid anhydride selected from the group consisting of monofunctional anhydrides effective as a curing agent for the epoxy resin. The thermosetting epoxy resin further comprises an epoxy reactive diluent. The conductive additive particles are selected from the group consisting of at least one of carbon black, nickel fiber, nickel flake, nickel beads and copper flake. The thermosetting epoxy resin is selected from the group consisting of bisphenol A epoxy resins, novolac epoxy resins and mixtures thereof and the epoxy reactive diluent is selected from the group consisting of phenyl glycidyl ether, butyl glycidyl ether, alkyl glycidyl ethers containing about 5 to 12 carbons, vinyl cyclohexene dioxide, endodicyclopentadiene dioxide, octylene oxide and neopenylglycol diglycidyl ether. The acid anhydride is selected from the group consisting of hexahydrophthalic anhydride, 1-methyl hexahydrophthalic anhydride, tetrahydrophthalic anhydride, 1-methyl tetrahydrophthalic anhydride, phthalic anhydride, polyazelaic polyanhydride, benzophenone tetracarboxylic acid dianhydride and mixtures thereof. The bisphenol A epoxy resin has an epoxy equivalent weight of from about 130 to 1200, the novolac epoxy resin has an epoxy equivalent weight of from 100 to 500 and the composition is cured. Reduction of porosity occurs by heating to between about 40° C. and 60° C. and drawing a vacuum of less than or equal to 10 m torr on the mixture. The temperature is carefully chosen so that the resin stays liquid during the vacuum cycle. Gelation (initial hardening) occurs at a temperature of about 130° C. to 140° C. in about 2 to 4 hours. The final cure takes about 13 to 18 hours at about 140° C. to 160° C. At the initial mixing, co-accelerators are added to give a faster cure at lower temperatures. The co-accelerators preferably comprise chromium acetyl acetonate accelerator and 1-methyl imidazole. An effective amount of alumina trihydrate is added to prevent dielectric breakdown, arcing and carbon tracking under high voltage conditions.

An improved current limiting composition comprises a chemical cross-linked cured epoxy thermosetting resin having a plurality of conductive additive particles dispersed therein and is made by the process of mixing an epoxy thermosetting resin containing more than one 1,2 epoxy groups per molecule with an acid anhydride curing agent, an epoxy reactive diluent, co-accelerators, and conductive additive particles to form a liquid mixture, heating the liquid mixture at a first temperature range below gelation temperature while drawing a vacuum to drive off volatiles and gases, heating at a second temperature range to promote gelation, heating at a third temperature range to effect a final cure using a first accelerator which does not become effective until the gelation temperature range and using a second accelerator which does not become effective until final cure temperature range.

An effective amount of said alumina trihydrate is added to the liquid mixture to prevent dielectric breakdown, arcing and carbon tracking under high voltage conditions in the current limiting compositions. The first co-accelerator is 1-methyl imidazole. The second co-accelerator is chromium acetylacetonate.

The first temperature range is about 40° C. to 60° C. A vacuum pump pulls a vacuum of about ≦10 m torr on the liquid mixture. The second temperature range is about 130° C. to 140° C. The third temperature range is about 140° C. to 160° C. Gelation takes about 2 to 4 hours in the second temperature range and final cure takes about 13 to 18 hours in the third temperature range.

The epoxy resin is a diglycidyl ether of bisphenol A, the epoxy reactive diluent is preferably a diglycidyl ether of neopentyl glycol, the acid anhydride hardener is preferably 1-methyl tetrahydrophthalic anhydride and the conductive additive particles are selected from the group consisting carbon black, nickel fiber, nickel flake, nickel beads and copper flake.

A process for making an improved current limiting composition comprises mixing an epoxy thermosetting resin containing more than one 1,2 epoxy groups, referred to as "epoxy groups" herein, per molecule with an acid anhydride curing agent, an epoxy reactive diluent, co-accelerators, and conductive additive particles to form a liquid mixture, heating the liquid mixture at a first temperature range below gelation temperature while drawing a vacuum to drive off volatiles and gases and continued heating at a second temperature range to promote gelation. A first co-accelerator is used which does not become effective until the gelation temperature range. The mixture is then heated at a third temperature range to effect a final cure, using a second co-accelerator which does not become effective until final cure temperature range.

BRIEF DESCRIPTION OF THE DRAWINGS

A full understanding of the invention can be appreciated from the following detailed description of the invention when read with reference to the accompanying graphs.

FIG. 2(a) shows the effect of 0% alumina trihydrate, FIG. 2(b) shows the effect of 10% alumina trihydrate and FIG. 2(c) shows the effect of 20% alumina trihydrate.

DESCRIPTION OF THE PREFERRED EMBODIMENT

Figure 1:
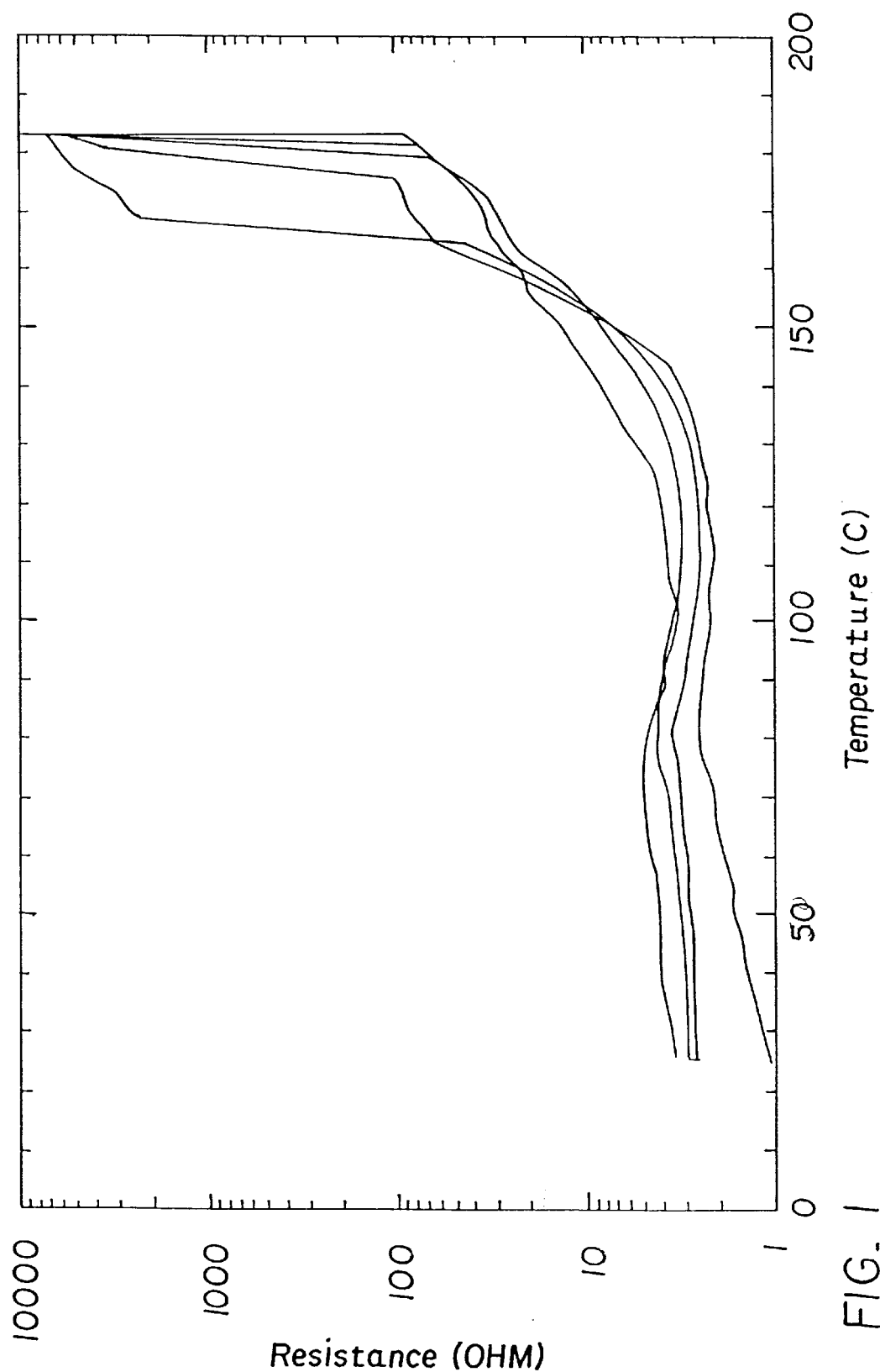
FIG. 1 is a resistance versus temperature graph showing the performance of the epoxy resin with 33% nickel fiber, 2% by weight carbon black and 10% by weight alumina trihydrate.

The improved PTC thermosetting epoxy composition of this invention allows the process for making low resistivity and temperature rise when the composition is used as a circuit component carrying normal current. When the current increases due to short circuit or overload, the composition temperature increases and changes to a high resistance state which limits the current to a safe value until the power is removed. When the power is removed, the material cools and reverts back to its original low resistance state. Compositions made in accordance with this invention have specific application as a resettable fuse or current limiter in motor controls and switch gear equipment.

This process of this invention preferably uses the glycidyl polyether of a dihydric phenol obtainable by reacting epichlorhydrin with a dihydric phenol in an alkaline medium at about 50° C., using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

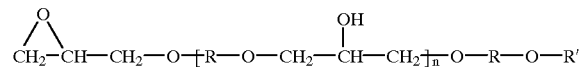

where n is an integer of the series 0,1,2,3, . . . , R represents the divalent hydrocarbon radical of the dihydric phenol, and R' may represent either a methylene epoxy group:

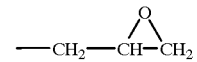

or a hydrogen atom H. Consequently, glycidyl polyethers of a dihydric phenol used in the invention have epoxy equivalency between 1.0 and 2.0. By the epoxy equivalency, reference is made to the average number of epoxy groups contained in the average molecule of the glycidyl ether. Preferably, in the formula above, R is:

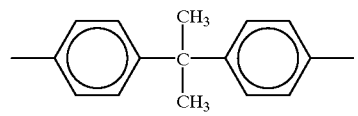

and these glycidyl polyethers are commonly called bisphenol A type epoxy resins. Bisphenol A (p,p-dihydroxydiphenyldimethyl methane) is the dihydric phenol used in these epoxies.

Typical epoxy resins of bisphenol A are readily available in commercial quantities and reference may be made to the *Handbook of Epoxy Resins* by Lee and Neville, 1967 McGraw-Hill Book Company for a complete description of their syntheses, herein incorporated by reference. Other epoxy resins that are useful in this invention and which can be used in place of or mixed with bisphenol A type epoxy resins include aliphatic epoxy resins,, cycloaliphatic epoxy resins and polyglycidyl ethers of a novolac. Reference may be made to *Plastic Materials* Chapter 22, by J. A. Brydson, 1966, herein incorporated by reference, for a complete description of these latter type epoxy resins.

The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The production of the reaction is generally a massive oxidation resistant aromatic compound, one example of which is represented by the formula:

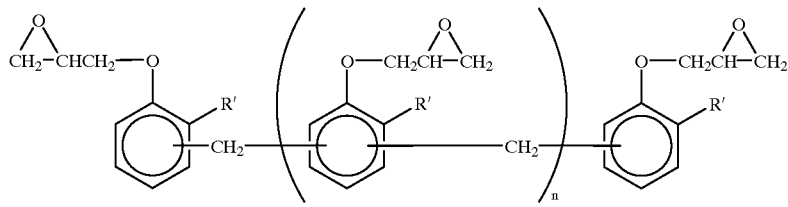

wherein n is an integer of the series 0, 1, 2, 3, etc. For epoxyphenol novolac resins R'=H. For epoxycresol novolac resins R'=CH$_3$.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The epoxy resins may be characterized by reference to their epoxy equivalent weight, which is the mean molecular weight of the particular resin divided by the mean number of epoxy units per molecule. In the present invention, the suitable epoxy resins are characterized by an epoxy equivalent weight of from about 130 to about 1200 for the bisphenol A type and from about 100 to 500 for the epoxy novolacs. Within this range there is a preferred range of epoxy equivalent weight of from about 150 to about 800 for the bisphenol A type and from about 125 to 350 for the epoxy novolacs.

The current limiter of this invention is made from a PTC component composed of a conductive polymer composition which exhibits PTC behavior. The current limiter is made from a polymeric component comprising a thermosetting epoxy resin and conductive particles dispersed in the thermosetting epoxy resin and two electrodes which are electrically connected to the PTC component. The two electrodes are utilized to connect the device in series in the electric circuit to be protected. The process to make the PTC component comprises the steps of mixing in a deep container the thermosetting epoxy resin with conductive particles, an acid anhydride hardener and an epoxy reactive diluent, co-accelerators and alumina trihydrate. The mixture is heated to between about 40° C. to 60° C. (first temperature range) and a vacuum of ≦10 m torr is drawn on the samples to remove the air introduced during mixing and therefore to allow better packing of carbon in the intermolecular structure. This temperature is carefully chosen so that the resin stays liquid during the vacuum cycle. It is undesirable for gelation to occur during this stage so that the vacuum successfully removes dissolved air and other volatives thereby reducing the porosity of the sample. If the cured resin is porous, it will be full of voids. Voids are known to be a cause for "partial discharges" in resins under an applied voltage. These "partial discharges" are very damaging to the resin causing breakdown and degradation of the polymer structure to continue unabated. The protective insulating layer of the polymer will be destroyed and device failure will occur. Vacuum degassing reduces the air and void content of the composition giving a more compact polymer system in which the conductive additives and epoxy chains are locked and intertwined into a more stable polymer matrix. This increase in compactness gives rise not only to more reproducible resistance responses with temperature but also gives a more dramatic increase in resistance value at peak performance.

The PTC component is heated for about 2 to 4 hours to gelation (initial hardening) at a temperature of about 130° to 140° C. (second temperature range), preferably at about 135° C. for 3 hours. The final cure takes about 13 to 18 hours at about 140° to 160° C. (third temperature range), preferably at about 150° C. for 6 hours. The thermosetting epoxy resin contains more than one 1,2 epoxy groups per molecule and is selected from the group consisting of bisphenol A epoxy resins, novolac epoxy resins and mixtures thereof. The bisphenol A epoxy resin has an epoxy equivalent weight of from about 130 to 1200, and the novolac epoxy resin has an epoxy equivalent weight of from 100 to 500. The acid anhydride is 55 to 165 parts by weight of the resin and is selected from the group consisting of hexahydrophthalic anhydride, 1-methyl hexahydrophthalic anhydride, tetrahydrophthalic anhydride, 1-methyl tetrahydrophthalic anhydride, phthalic anhydride, polyazelaic polyanhydride, benzophenone tetracarboxylic acid dianhydride and mixtures thereof. The epoxy reactive diluent is 30 to 60 parts by weight of the resin and is selected from the group consisting of phenyl glycidyl ether, butyl glycidyl ether, alkyl glycidyl ether containing about 5 to 12 carbons, vinyl cyclohexene dioxide, endodicyclopentadiene dioxide, octylene oxide and neopentyl glycol diglycidyl ether. The conductive additive particles are selected from the group consisting of at least one of carbon black, nickel fiber, nickel flake, nickel beads and copper flake. A typical loading of said conductive additive particles in the thermosetting epoxy resin is about 20 to 60% by weight. Reduction of porosity occurs by heating the liquid mixture to between about 40° C. to 60° C. and drawing a vacuum of about less than or equal to 10 m torr on the liquid mixture.

Gelation (initial hardening) occurs at a temperature of about 130° to 140° C. in about 2 to 4 hours. The final cure takes 13 to 18 hours at about 140° to 160° C. Co-accelerators are added during initial mixture to give a faster cure at lower temperatures and are preferably chromium acetylacetonate accelerator and 1-methyl imidazole. The co-accelerators are about 0.05 to 0.150 parts by weight of the epoxy resin. At the initial mixing an effective amount of alumina trihydrate is added to prevent dielectric breakdown, arcing and carbon tracking under high voltage conditions. The percentage of alumina trihydrate is about 10 to 20% by weight of the total composition.

The improved current limiting composition comprises a chemical cross-linked cured epoxy thermosetting resin having a plurality of conductive additive particles dispersed therein and is made by the process of mixing an epoxy thermosetting resin containing more than one 1,2 epoxy groups per molecule with an acid anhydride curing agent, an epoxy reactive diluent, co-accelerators, and conductive additive particles to form a liquid mixture. The liquid mixture is heated at a first temperature range below gelation temperature while drawing a vacuum to drive off volatiles and gases. It is heated to a second temperature range to promote gelation, and a third temperature range to effect a final cure. A first co-accelerator is used which does not become effective until the gelation temperature range is reached and a second co-acceleration is used which does not become effective until final cure temperature range is reached.

A process for making an improved current limiting composition comprises mixing an epoxy thermosetting resin containing more than one 1,2 epoxy groups per molecule with an acid anhydride curing agent, an epoxy reactive diluent, co-accelerators, and conductive additive particles to form a liquid mixture. The liquid mixture is then heated at a first temperature range below gelation temperature while drawing a vacuum to drive off volatiles and gases, then heated to a second temperature range to promote gelation, and then heat to a third temperature range to effect a final cure. A first co-accelerator is used which does not become effective until gelation temperature range and a second accelerator is used which does not become effective until final cure which is the third temperature range of about 140° C. to 160° C. Gelation takes about 2 to 4 hours at the second temperature range and final cure takes about 13 to 18 hours at the third temperature range. The epoxy resin is a diglycidyl ether of bisphenol A, the epoxy reactive diluent is a diglycidyl ether of neopentyl glycol, the acid anhydride hardener is 1-methyl tetrahydrophthalic anhydride and the conductive additive particles are selected from the group consisting of carbon black, nickel fiber, nickel flake, nickel beads and copper flake. An effective amount of the alumina trihydrate is employed in the liquid mixture to prevent dielectric breakdown, arcing and carbon tracking under high voltage conditions in the current limiting compositions wherein the first co-accelerator is 1-methyl imidazole. The second co-accelerator is chromium acetylacetonate. A vacuum pump pulls a vacuum of about ≦10 m torr on the liquid mixture at about 40° C. to 60° C. (the first temperature range). The second temperature range is about 130° C. to 140° C.

EXAMPLE 1

A resin formulation was made containing 25 grams of a liquid diglycidyl ether of bisphenol A resin, having an epoxy equivalent weight of 172–176 and a viscosity at 25° C. of 4000–5500 cp. (sold commercially by Dow Chemical Co. under the trade name "DER-332"), 25 grams of diglycidyl ether of neopentyl glycol (DIGENPG) diluent having an epoxy equivalent weight of about 150 and a viscosity at 25° C. of 6–8 cp., 52.50 grams of 1-methyl tetrahydrophthalic anhydride hardener (MTHPA) and 0.10 grams of chromium acetyl acetonate accelerator (CrAcAc). To give faster processing times 0.1 grams of 1-methyl imidazole (1-MI) is used in tandem with chromium acetylacetonate. The 1-methyl imidazole is used for the lower temperature gelation below 140° C. and chromium acetylacetonate is used as a latent co-accelerator for high temperatures above about 140° C. When the co-accelerators are used with vacuum degassing of ≦10 m torr a synergistic effect occurs which greatly improves the electrical resistance of the resultant product. The epoxy resin consists of 50 parts (by weight) of glycidyl ether of bisphenol A and 50 parts (by weight) of neopentyl glycol diglycidyl ether. This fluid composition can readily be loaded with various conductive additives. Of particular interest were the following compositions give in Table 1 below:

TABLE 1

| Sample | Metal | | Carbon Black | | C-331 | Initial Resist | Switch Temp | Max Resist | Max/ |
| --- | --- | --- | --- | --- | --- | --- | --- | --- | --- |
| ID | Type | Wt. % | Type | Wt. % | Wt. % | Ω | ° C. | Ω | Initial |
| 1 | Ni fiber | 30 | XC-72 | 3 | — | 280 | 140 | 1600 | 5.7 |
| 2 | Ni fiber | 30 | XC-72 | 3 | 10 | 4 | 150 | 6300 | 1575 |
| 3 | Ni fiber | 30 | XC-72 | 3 | 20 | 13 | 140 | 6300 | 485 |
| 4 | Ni fiber | 31 | XC-72 | 2 | 10 | 1.6 | 160 | 13000 | 8125 |
| 5 | Ni fiber | 33 | XC-72 | 2 | 10 | 2.3 | 160 | 3000 | 1304 |
| 6 | Ni fiber | 31 | XC-72 | 2 | 20 | 5 | 130 | 32000 | 6400 |
| 7 | Ni fiber | 28 | XC-72 | 4 | 10 | 4.5 | 150 | 1600 | 356 |
| 8 | Ni fiber | 30 | BP2000 | 3 | 10 | 275 | 160 | 800 | 2.9 |
| 9 | Ni flake | 30 | XC-72 | 3 | — | 250 | 160 | 2500 | 10 |
| 10 | Ni beads | 31 | XC-72 | 2 | 10 | 4500 | 160 | 12600 | 2.8 |
| 11 | Ni beads | 40 | XC-72 | 4 | 10 | 8 | 140 | 3980 | 498 |
| 12 | Cu flake | 30 | XC-72 | 3 | 10 | 520 | 130 | 2200 | 4.2 |

As shown in Table 1, the addition of alumina trihydrate (C-331) enhances switching characteristics (samples 1–3). The most dramatic switching occurs with sample 4 where increase in resistance is 8125. It is also demonstrated that the use of a higher surface area carbon (BP2000) does not enhance switching (sample 8). Nickel fiber (samples 1–8) is also shown to be superior to other metal fillers (samples 9–12).

The percentages shown above in Table 1 are based on weight. The various compositions were used to embed two stranded copper electrodes in a 10 ml plastic beaker by using the resins as "potting" material to cover the electrodes. The initial cure (gelation) of the potted samples occurred at about 130° C. to 140° C. in about 2–4 hours, with best results occurring with an initial cure achieved at about 135° C. in about 3 hours. The final cure occurred at a temperature of about 140° C. to 160° C. in about 13 to 18 hours, with best results occurring with a final cure achieved at about 150° C. in about 16 hours. Prior to gelation, the liquid samples were heated to about 40° C.–60° C. using a vacuum pump for a vacuum of about ≦10 m torr to remove air introduced during mixing and therefore to allow better packing of carbon in the intermolecular structure. Alumina trihydrate was added in the initial mixing to help prevent dielectric breakdown, arcing and tracking during high voltage conditions in the PTC component.

The desired properties for CLP applications include having a sharp, well-defined, stable and reproducible Glass Transition Temperature, having an initial high and stable electrical conductivity and having the ability to withstand high temperature and voltage during repeated "switching" cycles without loss of any of these properties. The above epoxy compositions are purposely formulated to be processed in a controlled way to obtain the above stated desired properties. One very important step is to ensure that voids are not left after cure since this would have a very deleterious effect on the performance of the CLP device. Latent catalysts and co-accelerators are used in the resin building to allow heating of the resins under vacuum for prolonged periods of time without causing premature gelation.

Proper processing of the mixtures is just as important as having the right composition. Three-roll milling was used to obtain complete dispersion of the fillers in the resin matrix. Furthermore, evacuation of the sample after mixing and filling the mold was essential to remove voids and thereby obtain the best switching characteristics.

To monitor the change of resistivity with temperature, the samples were placed in a Tenney BTR programmable temperature chamber and cycled between 23° C. and 180° C. During this time, the PTC resistance characteristic of the samples were measured using a Keithley 617 electrometer and Keithley 705 scanner to switch between several samples. Resistance measurements were recorded at 3–5 minute intervals using a computer.

FIG. 1 shows the effect of temperature on the resistance (log resistance) for two cycles of sample 4 in Table 1. Samples containing 31% nickel fibers plus 2% carbon black and 20% alumina trihydrate give the best "switching" behavior as shown by the rapid increase in resistance as the temperature increases. The ratio for the maximum resistance/minimum resistance is 8125 for sample 4.

Figure 2A:
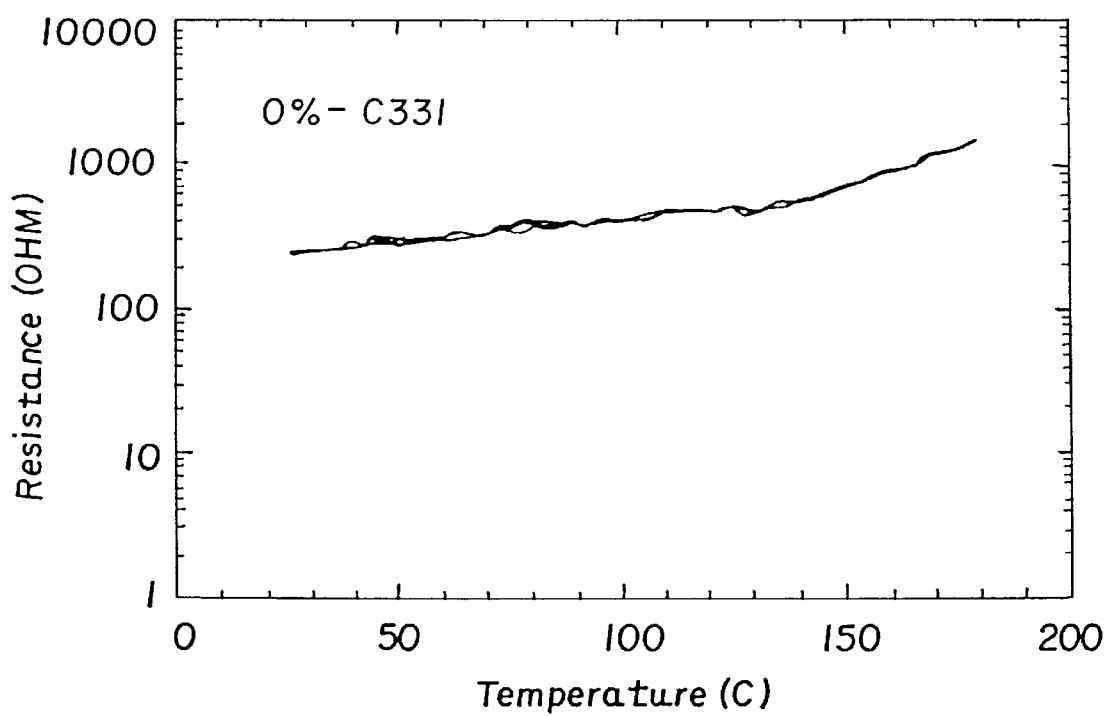
FIGS. 2(a)–2(c) show the effect of varying amounts of alumina trihydrate on the resistance of epoxy resin mixture.
Figure 2B:
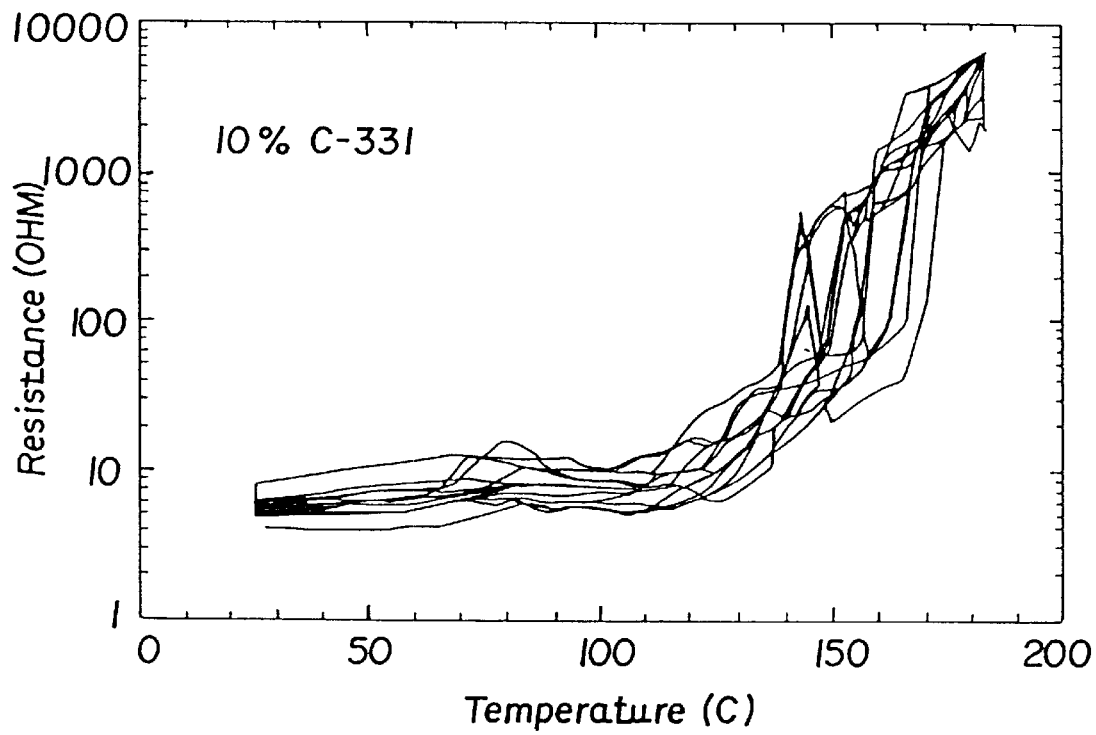
Figure 2C:
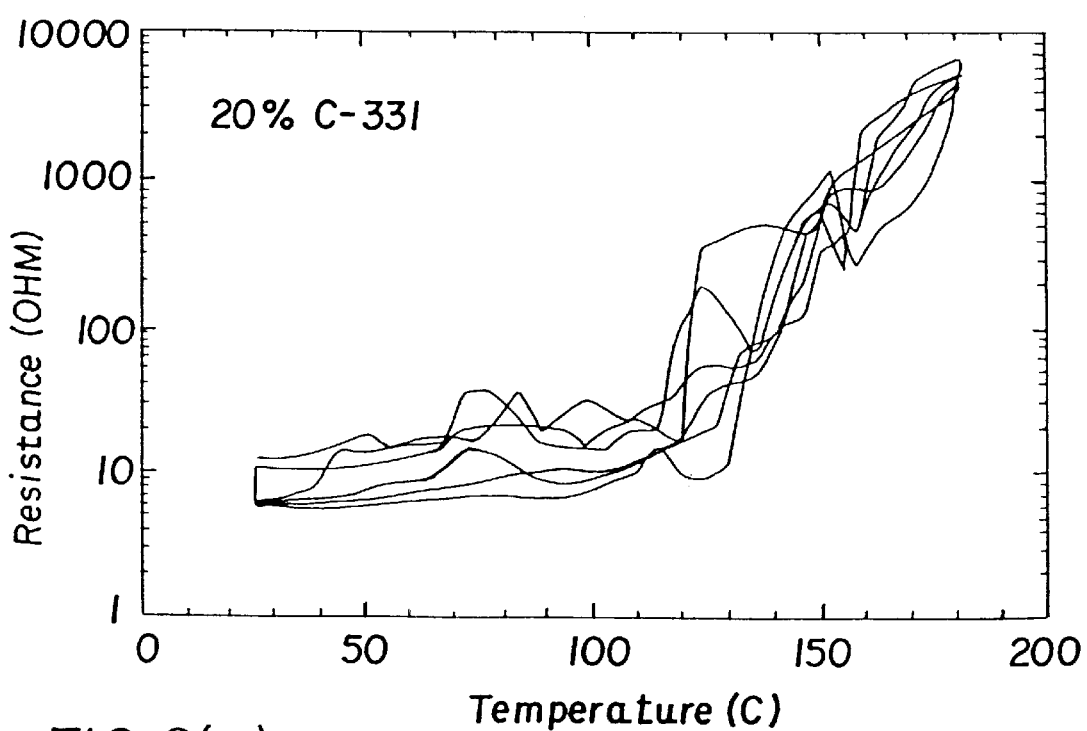

FIGS. 2(a)–2(c) show how varying amounts of alumina trihydrate affect an increase in resistance as the temperature increases. FIG. 2(a) illustrates several cycles of sample 1 in Table 1 where 0% alumina trihydrate was used. The most dramatic increases in resistance occur when the effective amount of alumina trihydrate is 10% to 20% as shown by samples 2 and 3 (FIGS. 2(b) and 2(c)). Sample 1 (FIG. 2(a)) has no alumina trihydrate added and the ratio of max resistance/min resistance is very low.

Figure 3A:
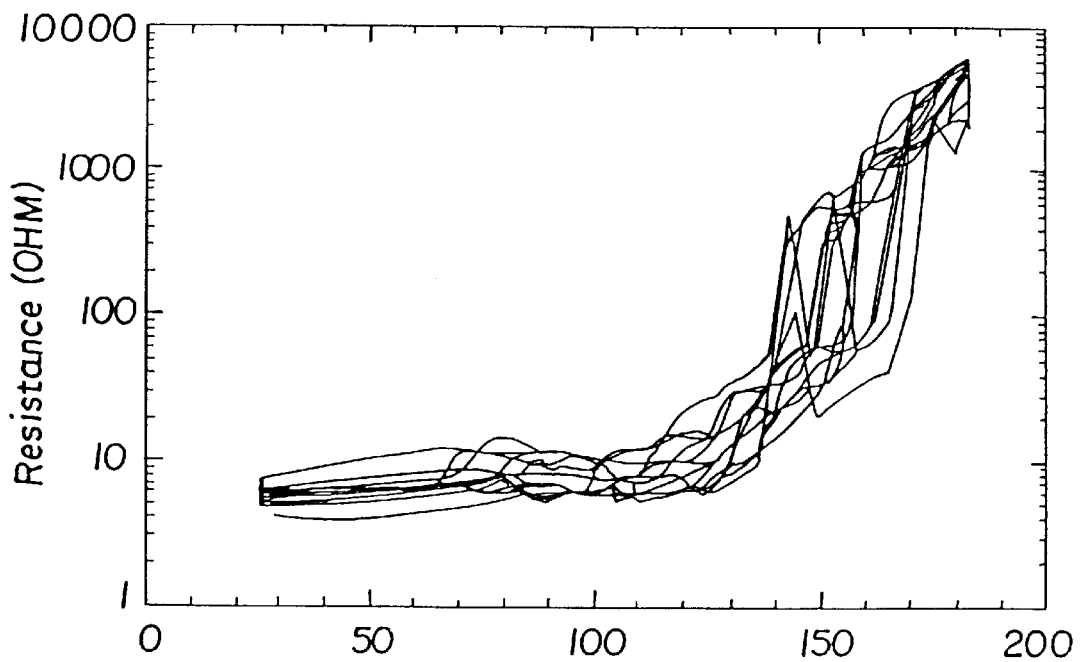
FIGS. 3(a) and 3(b) show that higher surface area carbon BP2000 in FIG. 3(b) does not enhance switching compared to carbon black in the resistance versus temperature graph of FIG. 3(a).
Figure 3B:
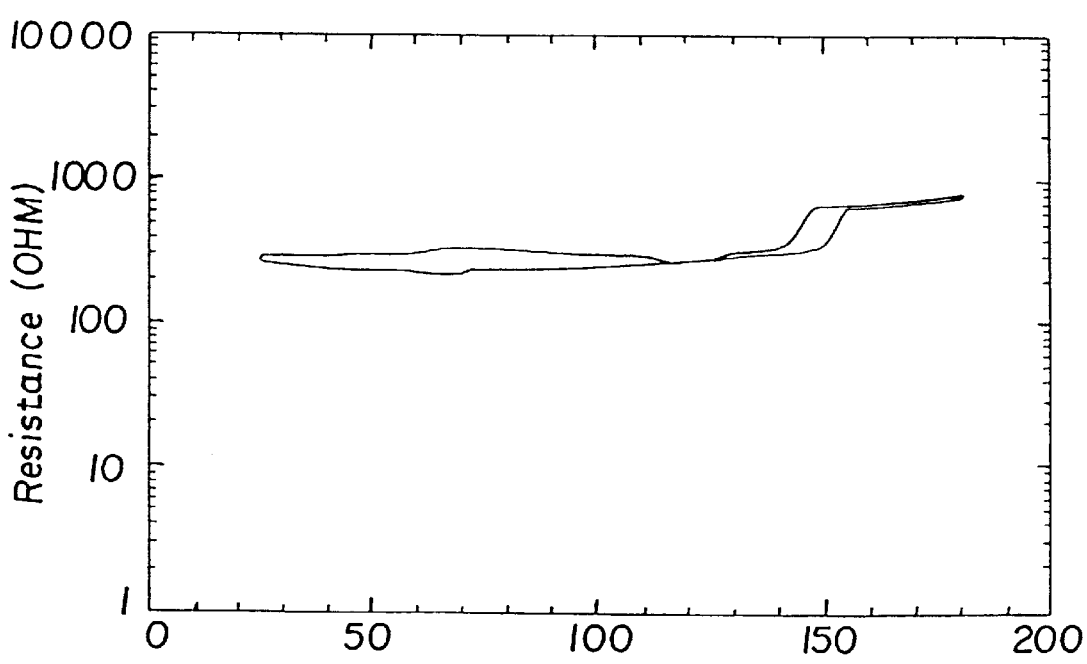

FIG. 3(b) shows that higher surface area carbon BP2000 (sample 8 in Table 1) does not enhance switching as shown by the ratio of max resistance/min resistance compared to FIG. 3(a) using carbon black in sample 2 of Table 1.

Figure 4:
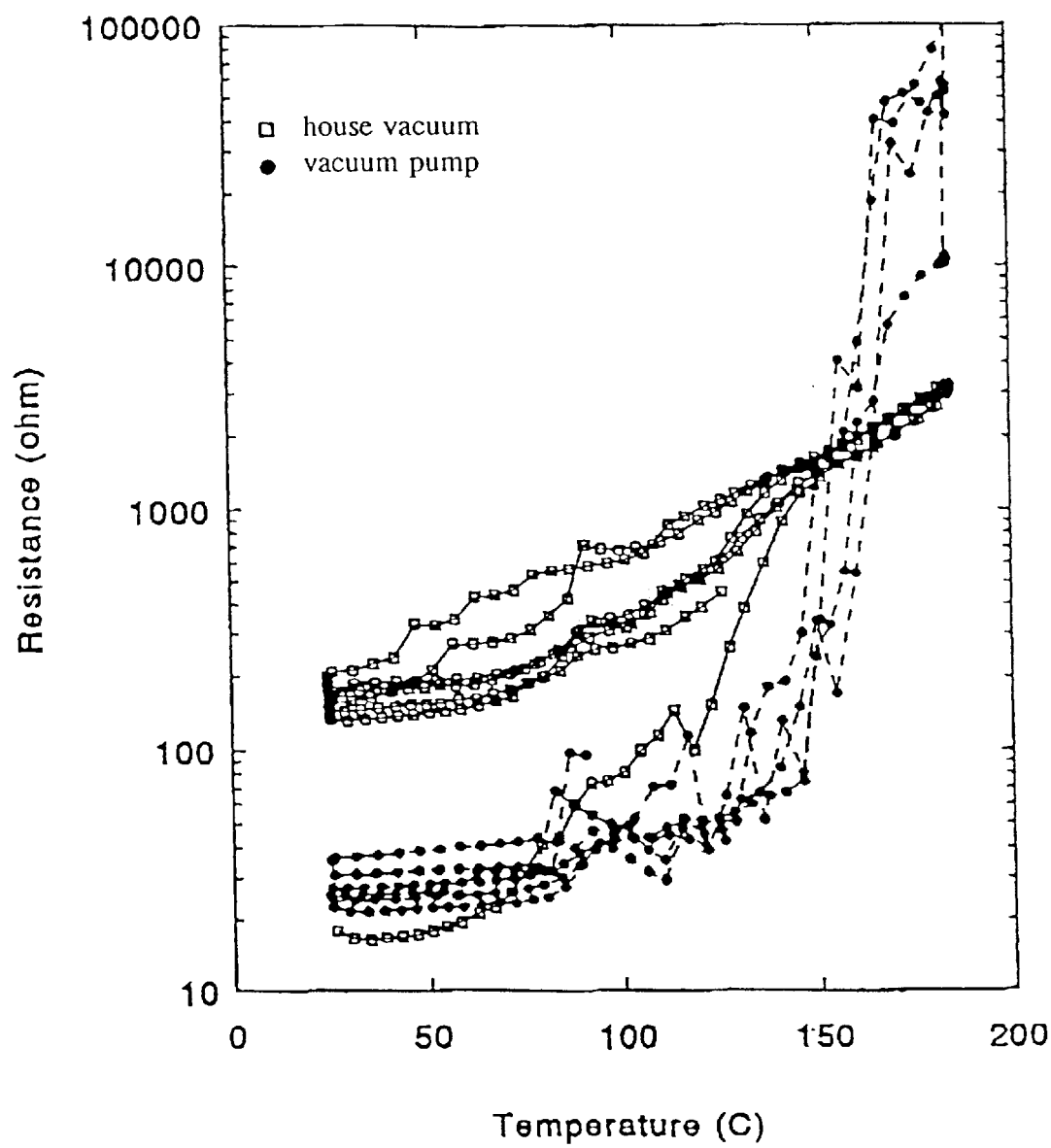
FIG. 4 shows the electrical resistance of samples having 82% nickel spheres and 5% carbon black wherein the processing includes using a low-level house vacuum versus using a vacuum pump at ≦10 m torr.

The importance of the evacuation step prior to gelation is shown in the switching characteristics for two samples of identical composition. Two samples were prepared using the process of Example 1. Each sample included 82% CNS nickel spheres and 5% XC-72 carbon black, with the remainder being the resin formulation. One sample was evacuated using a house vacuum (approximately 1–10 torr) and the other using a dedicated vacuum pump (≦10 m torr). The magnitude and reproducibility of resistance switching are both substantially improved by using the ≦10 m torr vacuum. FIG. 4 shows better resistance of beaker samples having 82% CNS nickel spheres and 5% XC-72 carbon black using a vacuum pump at ≦10 m torr versus a house vacuum for degassing prior to gelation.

The data in Table 1 shows that the sample containing nickel fibers plus carbon black give the best "switching" behavior as shown by the rapid increase in resistance as the temperature increases. Nickel fiber (A-10) is superior to other metal fillers such as nickel flake, nickel beads or copper flakes.

Metal fibers such as nickel are more effective in giving the desired PTC effect than metal flakes because metal fibers give better point-to-point contact than flakes. For that reason, they give a more abrupt separation during temperature rise and hence a more rapid rise in resistance with temperature.

The temperature range where there is a rapid increase in resistance as the temperature increases occurs at about 140° C. to 170° C. which is close to the expected Glass Transition Temperature (Tg) of this particular epoxy resin. This "switching" behavior is repeated through several temperature cycles as shown in FIG. 1. Vacuum degassing of the liquid sample before curing gives a more reproducible resistance change. This temperature is carefully chosen so that the resin stays liquid during the vacuum cycle. It would appear that the vacuum degassing before gelation temperatures reduces the air and void content of the composition giving a more compact polymer system in which the conductive additives and epoxy chains are locked and intertwined into a more stable polymeric matrix. This increase in compactness gives rise not only to more reproducible resistance responses with temperature but also gives a more dramatic increase in resistance value at the peak temperature, as shown in FIG. 4. This slow curing procedure discourages the formation of voids in the cured thermoset polymer resulting from trapped air or gases caused by a too rapid cure at high temperature. A rapid cure at high temperature causes electrical discharges within the material to occur during voltage stress. These electrical discharges (also known as partial discharges) would lead to significant degradation of the polymer structure and premature failure of the PTC device. The thermoset epoxies are low-viscosity liquids at room temperature which facilitates the mixing of conductive additives and the other fillers into the epoxy resin at high loadings before vacuum pump degassing and curing at an elevated temperature. Processing is a critical factor in determining the properties of the finished product.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims.

What is claimed is:

1. A process for making an improved current limiting composition comprising:

mixing an epoxy thermosetting resin containing more than one 1,2 epoxy group per molecule with an acid anhydride curing agent, an epoxy reactive diluent, first and second co-accelerators, and conductive particles to form a liquid mixture;

heating said liquid mixture at a first temperature range below gelation temperature while drawing a vacuum to drive off volatiles and gases;

heating at a second temperature range to promote gelation;

heating at a third temperature range to effect a final cure;

said first co-accelerator selected so as not to become effective to promote gelation until said second temperature range "comprising 1-methyl imidazole"; and said second co-accelerator selected so as not to become effective until said third temperature range "comprising chromium acetylacetonate".

2. The process of claim 1, further employing an effective amount of alumina trihydrate in said liquid mixture to prevent dielectric breakdown, arcing and carbon tracking tinder high voltage conditions in said current limiting composition.

3. The process of claim 2, wherein said first temperature range is about 40° C. to 60° C.

4. The process of claim 3, wherein said vacuum is drawn by a vacuum pump pulling a vacuum of about≦10 m torr on said liquid mixture.

5. The process of claim 4, wherein said second temperature range is about 130° C. to 140° C.

6. The process of claim 5, wherein said third temperature range is about 140° C. to 160° C.

7. The process of claim 6, wherein gelation takes about 2 to 4 hours at said second temperature range and final cure takes 13 to 18 hours at said third temperature range.

8. The process of claim 7, wherein said epoxy resin is a diglycidyl ether of bisphenol A, said epoxy reactive diluent is a diglycidyl ether of neopentyl glycol, said acid anhydride hardener is 1-methyl tetrahydrophthalic anhydride and said conductive additive particles are selected from the group consisting of carbon black, nickel fiber, nickel flake, nickel beads and copper flake.

* * * * *